UNITED STATES PATENT OFFICE.

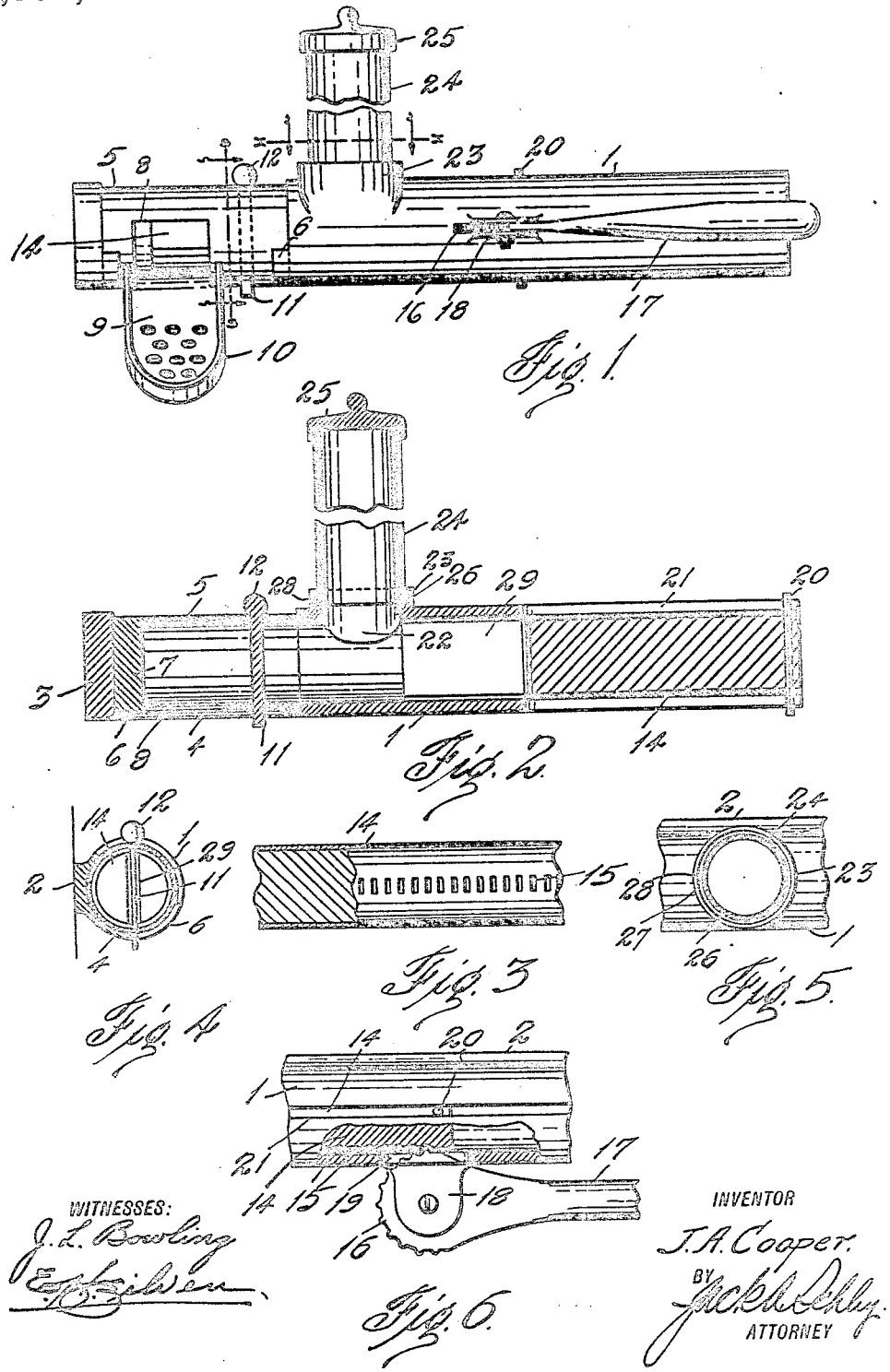

JAMES A. COOPER, OF GRAND SALINE, TEXAS.

FRUIT-CUTTER AND JUICE-EXTRACTOR.

1,070,417.

Specification of Letters Patent. Patented Aug. 19, 1913.

Application filed August 6, 1912. Serial No. 713,525.

*To all whom it may concern:*

Be it known that I, JAMES A. COOPER, citizen of the United States, residing at Grand Saline, in the county of Van Zandt and State of Texas, have invented certain new and useful Improvements in Fruit-Cutters and Juice-Extractors, of which the following is a specification.

This invention relates to new and useful improvements in fruit cutters and juice extractors.

The objects of the invention are: the provision of an apparatus provided with a magazine in which the fruit may be stored and from which it is delivered into position to be operated upon; the provision of a plunger coöperating with a knife whereby the fruit is severed as the plunger is driven forward; the provision of means co-acting with the plunger whereby the fruit is compressed and the juice extracted; the provision of a removable housing carrying the knife and provided with a discharge chute having perforations, whereby the juice may be delivered into a receptacle and the seeds and rind ejected to one side; and the provision of a readily removable knife.

A still further object of the invention is to provide an apparatus of the character described that will be strong, durable, efficient, and simple and comparatively inexpensive to construct, also one in which the several parts will not be likely to get out of working order.
With the above and other objects in view the invention has relation to certain novel features of construction and operation, an example of which is described in the following specification and illustrated in the accompanying drawings, wherein:

Figure 1 is a side elevation of the apparatus, Fig. 2 is a longitudinal sectional view, Fig. 3 is a detail of the plunger, Fig. 4 is a cross section on the line S—S of Fig. 1, Fig. 5 is a cross section on the line x—x of Fig. 1, and Fig. 6 is a detail of the plunger operating means.

In the drawings the numeral 1 designates a cylindrical metal barrel having an elongated boss 2 along one side which offers a flat face for securing the barrel to a fixed supporting surface. The barrel has one end 3, solid and the other end open. Adjacent the end 3 the barrel is cut out and the remaining web 4 is reamed out to receive a tubular housing 5 in such a way that the inner surface of the housing will be flush with the inner surface of the barrel.

The ends of the housing are supported on flanges 6 which with the web extend substantially around the housing thus permitting it to be removed and yet holding it in place, as shown in Fig. 4. The forward end of the housing has an integral wall or plug 7 adjacent which a discharge opening 8 is provided. From the lower portion of this opening a discharge 9 projects laterally from the housing. This chute extends downward at an angle and is provided with an upstanding marginal flange 10, which guides the juice to the perforations.

Near the opening 8 a knife 11 is disposed vertically in the housing. This knife is passed through longitudinal slots so as to present its cutting edge to the fruit and is provided with a head 12 which rests on the upper side of the housing and supports the knife. The housing may be removed from the barrel and the knife removed from the housing; thus the parts are readily accessible and cleanable.

A plunger 14 is slidable in the barrel. This plunger has a soft core, as wood, surrounded by a metal sleeve. Along one side of the plunger teeth 15 are pressed into the sleeve and engage with the teeth of a segment 16 formed on the inner end of a handle lever 17. The lever is pivoted between ears 18 projecting from the barrel and the segment engages the teeth 15 through a slot 19 in the barrel between the ears, as shown in Fig. 6. A guide pin 20 is passed through the plunger and has its ends engaging in longitudinal guide slots 21 provided in the barrel.

The parts are related so that the lever 17 will be forward adjacent the housing 5 when the plunger is retracted, which is its normal position. With the plunger in this position its forward end is adjacent an inlet opening 22 formed in a boss 23 on the upper side of the barrel, the said opening thus being between the plunger and the housing. The boss is shouldered to receive a tubular glass magazine 24 disposed vertically and provided with a cap 25 at its upper end. At the bottom of the magazine an outwardly directed flange 26 having a recess 27 is provided as shown in Figs. 2 and 5. A pin 28 extends inward from the boss and in placing the magazine the pin passes through the recess 27 so that the flange stands below said pin and thus by giving the magazine a slight turn the recess is moved from under the pin which bearing on the flange maintains the magazine in an upright position.

Fruit such as limes being placed in the magazine will stand superposed, the lowermost lime being in the barrel in the path of the plunger. One wishing to cut a lime and extract the juice places a glass under the chute 9 and swings the lever 17 away from the chute. By means of the segment 16 the plunger is moved forward thus carrying the lime into engagement with the knife 11. The plunger has a vertical slot 29 which receives the knife after the lime has been forced past said knife and severed. Continued movement of the plunger forces the severed lime into engagement with the wall 7 against which it is compressed. The juice is thus expelled and passes down the chute 9 and through the perforations to the glass (not shown). The walls 3 and 7 give ample thickness and rigidity to withstand the compression of the lime. When the lever is swung in the opposite direction the plunger is withdrawn to its normal position, thus releasing the severed and compressed lime which is free to roll down the chute and over the flange 10 to waste. When the plunger passes from under the inlet opening 22, another lime will drop into the barrel in the path of said plunger and in position for successive operations.

It is apparent that the operator is not required to handle the fruit after it is placed in the magazine and the entire apparatus is accessible for inspection and cleansing.

What I claim, is:

1. In a fruit cutter and juice extractor, an elongated barrel having a cut-away portion at one end and a fruit inlet between said cut-away portion and the other end of the barrel, a housing removably supported in the cut-away portion of the barrel, a plunger operating in the barrel under the inlet thereof and having passage into the housing, a knife mounted in the housing in the path of the plunger, and means for operating the plunger.

2. In a fruit cutter and juice extractor, an elongated barrel having a cut-away portion at one end and a fruit inlet between said cut-away portion and the other end of the barrel, a housing removably supported in the cut-away portion of the barrel, a plunger operating in the barrel under the inlet thereof and having passage into the housing, a knife mounted in the housing in the path of the plunger, teeth on the plunger, and a handle lever having a toothed segment engaging the plunger teeth through the wall of the barrel.

3. In a fruit cutter and juice extractor, a barrel having a fruit inlet, a plunger in the barrel operating under the inlet, a removable housing fitting in the barrel and having a discharge opening and a solid wall at one end, and a knife removably supported in the housing.

4. In a fruit cutter and juice extractor, a barrel having a fruit inlet, a plunger in the barrel operating under the inlet, a removable housing fitting in the barrel and having a discharge opening and a solid wall at one end, a knife removably supported in the housing, and a chute provided with perforations and extending from the housing at the discharge opening thereof.

5. In a fruit cutter and juice extractor, a barrel having a fruit inlet, a fruit magazine mounted over the inlet of the barrel, a plunger mounted in the barrel, a lever having operating connection with the plunger, a housing removably mounted in the barrel end provided with a discharge opening, and a knife mounted in the housing.

In testimony whereof I have signed my name to this specification in the presence of two subscribing witnesses.

JAMES A. COOPER.

Witnesses:
JACK A. SCHLEY,
J. C. COOPER.

---

Copies of this patent may be obtained for five cents each, by addressing the "Commissioner of Patents, Washington, D. C."